Aug. 21, 1951     C. R. S. SEARS ET AL     2,565,439
SUBSOIL TREATING MACHINE
Filed Feb. 14, 1944                         2 Sheets—Sheet 1
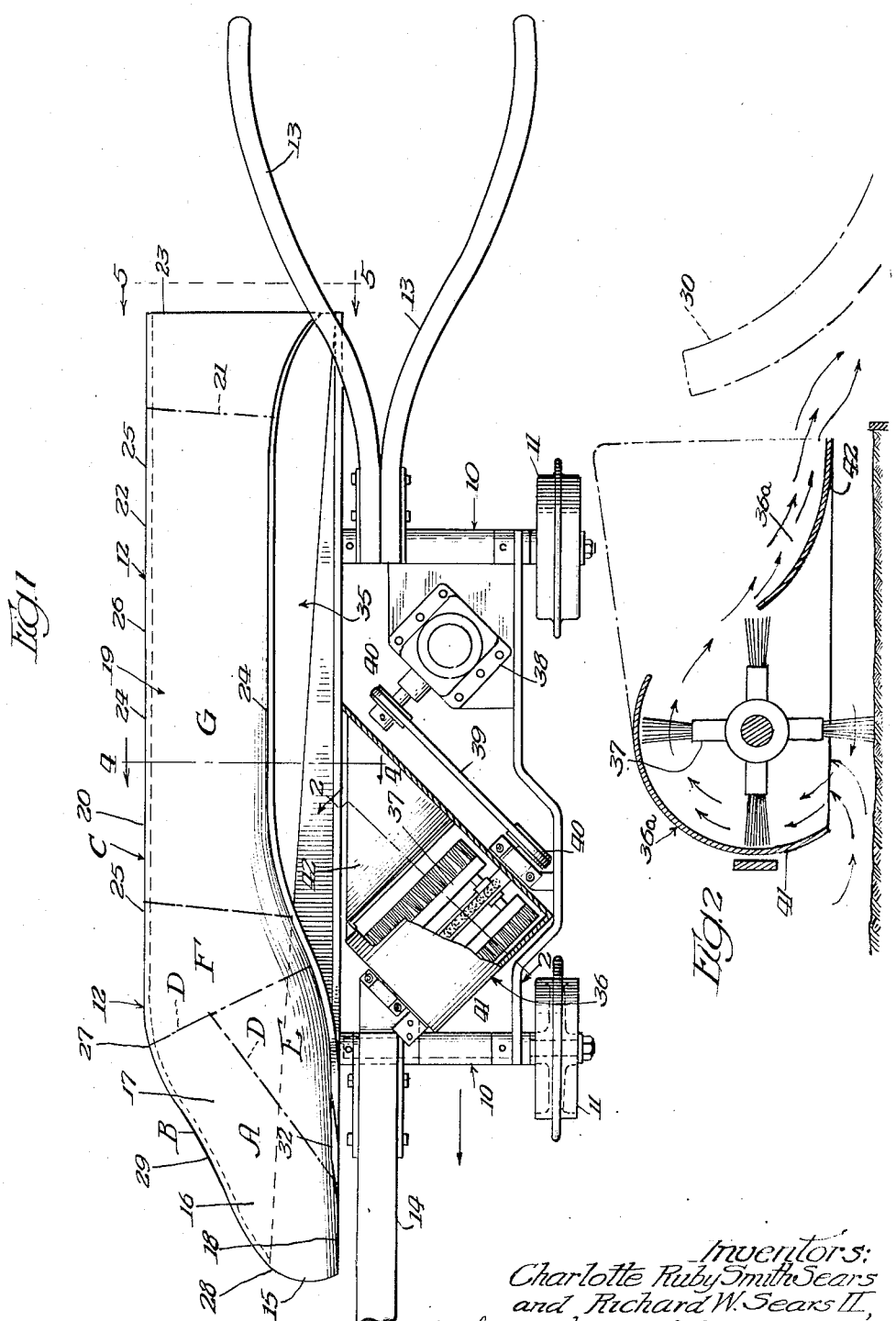
Inventors:
Charlotte Ruby Smith Sears
and Richard W. Sears II,
By Spencer, Marzall, Johnston & Cook,
Attys.

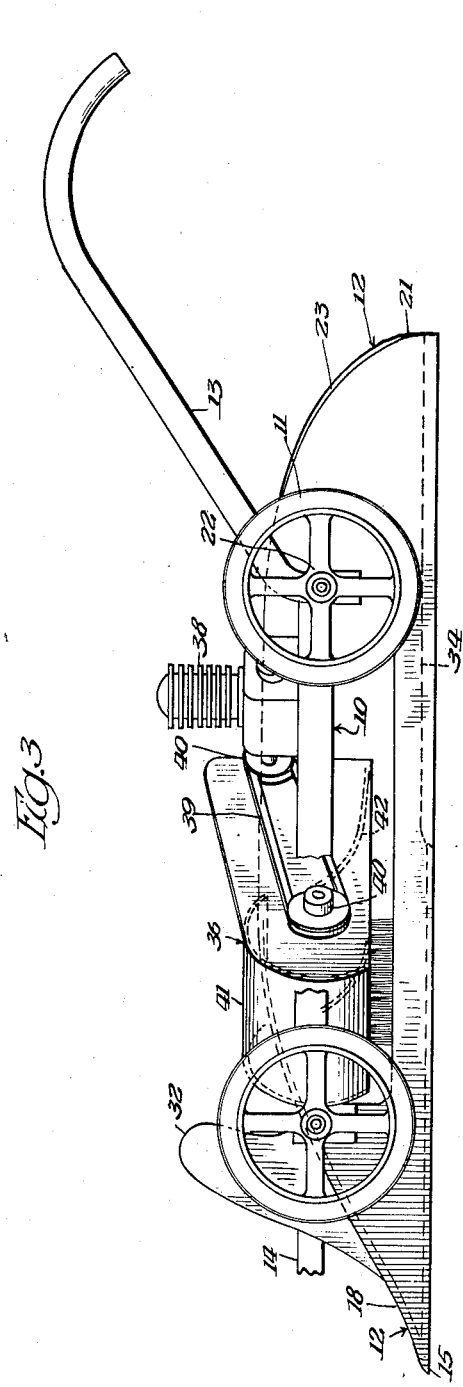
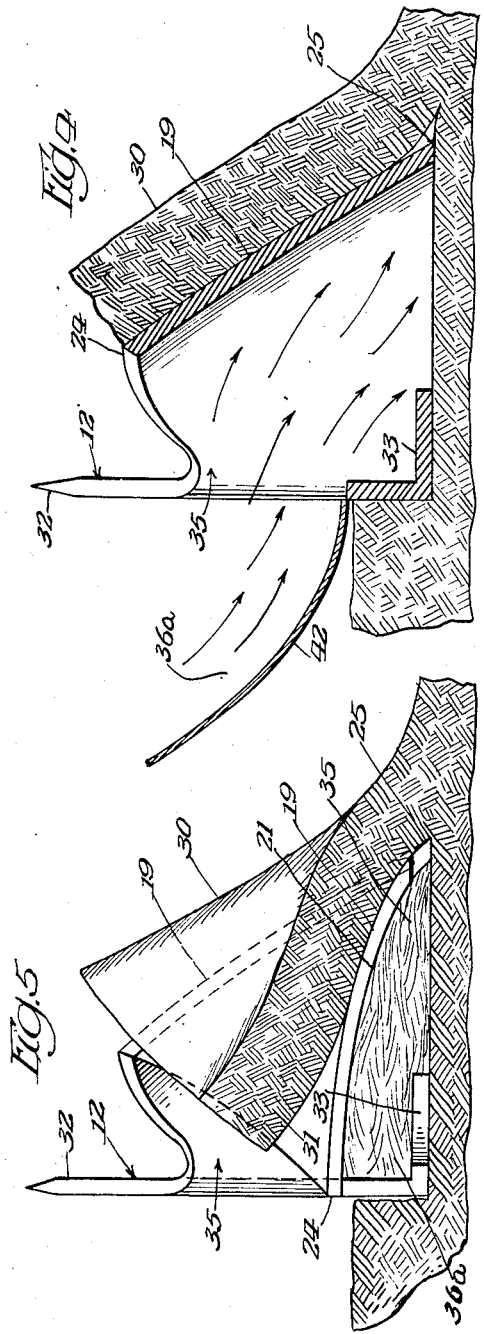

Patented Aug. 21, 1951

2,565,439

UNITED STATES PATENT OFFICE 2,565,439

SUBSOIL TREATING MACHINE

Charlotte Ruby Smith Sears and Richard W. Sears, II, Evanston, Ill.

Application February 14, 1944, Serial No. 522,218

5 Claims. (Cl. 97—10)

1

This invention relates to farming implements and to a method of cultivating or tilling soil.

An important object of the present invention is the provision of a new and improved method for treating or cultivating soil in such a manner as to overcome many of the inherent disadvantages in the conventional plowing method now being practiced such as by substituting for the conventional method of applying fertilizer on top of the soil and then turning over the soil and then plowing under the fertilized top soil, the new and improved method herein contemplated which consists in lifting the top soil a certain amount or distance and then applying fertilizer under the lifted soil after which time the prelifted top soil is replaced in substantially its original position.

Another important object of the present invention is the provision of a new and novel method of cultivating soil which consists in raising or lifting the top soil, or a portion of the soil at the top thereof, and then causing the soil to be returned in its natural or nearly natural or precultivated state, fertilizer being applied under the raised or lifted but not turned-over soil before it has been returned to its original, or nearly original, state.

Another object of the invention is the provision of a new and improved farming implement which is constructed and arranged to lift the top soil, or a portion thereof, without turning it over so as to permit fertilizer to be applied underneath the lifted, but not turned over, soil, the soil, after the application of fertilizer thereunder, gravitating to substantially the same position it had prior to the operation effected by the new implement.

Still another object of the invention is the provision of an improved farming implement which is so shaped and constructed to shear and lift up the soil without turning it over and hold up the so lifted soil to receive fertilizer from a separate device if desired, and then permit the lifted soil to be replaced on top of the fertilizer.

A further object of the invention resides in the provision of a farm implement which has a soil lifting but not soil turning-over part, which has a pocket properly juxtaposed to receive and distribute fertilizer at the proper time and place, and which will permit the lifted soil to be returned by gravity or otherwise to its original or nearly original state.

A still further object of the invention is the provision of a farming implement in either single or double construction to insure the desideratum intended and which may be positioned in gangs or multiples, side by side relationship, or substantially so, instead of the rearwardly staggered arrangement now employed in so called "gang plows."

Other objects of the invention reside in the provision of a new and improved farming implement which has the parts thereof constructed, arranged and contoured in a certain predetermined manner, which is strong and durable in construction but relatively light in weight, which can be easily operated, controlled or manipulated, which can be readily manufactured, which can be arranged in series or multiples, which is adapted for cooperation with other elements, and which is not likely to get out of order.

Numerous other objects and advantages will be apparent throughout the progress of the specification which follows.

The accompanying drawings illustrate certain selected embodiments of the invention and the views therein are as follows:

Fig. 1 is a detail top plan view of the improved farming implement, and embodying the invention;

Fig. 2 is a detail sectional view on the line 2—2 of Fig. 1;

Fig. 3 is a detail elevational view of the improved implement and embodying the invention;

Fig. 4 is a detail sectional view on the line 4—4 of Fig. 1 and showing the manner in which the soil is raised without turning it over, and the manner in which fertilizer may be placed under the lifted soil; and Fig. 5 is a detail end view looking in the direction of the arrows 5—5 of Fig. 1 and showing the manner in which the soil is being returned to its original or nearly original state after having been previously lifted and fertilizer applied therebeneath.

The farming implement herein shown for the purpose of illustrating the invention comprises a properly constructed and braced frame 10, which may have supporting wheels 11 mounted on one side thereof. A sod shearing and sod raising and supporting element or member 12 may be mounted on the frame on the side opposite to that carrying the wheels. Manipulating handles 13, 13, which may be used for steering and determining the depth of cut may be operatively secured to the rear of frame 10, and a front pulling bar 14 may be arranged at the front of the frame so that the implement may be propelled by a tractor, by horses or by other means as desired or needed. The soil shearing, lifting, and supporting member 12 comprises a conventional plowshare nose portion or zone A having a leading edge part B. A soil operating portion or zone C is arranged in flush relationship with part or zone A along its two sides or edges D. The portion or zone C has an area or zone E which slopes upward and inward to lift the soil angularly upward, and an area or zone G which slopes upward at as steep an angle as possible without turning over the soil. The relatively steep angle of the part or zone G permits for greater clearance for the placement of fertilizer below and behind member 12. The angle of the member C however is governed by the type of soil cultivated as well as by the depth of the soil lifted and supported. The area or zone F of soil operating member serves to meld the areas E and G smoothly into each other. The extreme back of soil operating part or zone C of the member 12 is so constructed and arranged to permit the soil to gravitate to original or substantially original position.

The soil shearing, lifting and supporting member 12, at the nose A, has a relatively thin plow-like nose or point 15 similar to the shaped front of a conventional plow share, sloping upwardly from front to rear as indicated at 16, and outwardly and downwardly as indicated at 17 from the straight inner front portion 18 at the front, Fig. 1. The soil operating side 19 of the member 12 which comprises the portions or zones A to G slopes upwardly from front to rear beginning at the point 15 until it reaches substantially to the point indicated at 20 where it remains relatively straight longitudinally to the end 21 of the zone G. If desired the extreme rear end of the member 12, rearward of the zone G may have a relatively sharp or steep downward dropping portion 22 which extends to the extreme end 23 of the member 12.

The operating side 19 of the member 12, at the zone or part C may slope arcuately outwardly and downwardly from its inner edge 24 to its outer edge or side 25. The outer side or edge 25 is relatively straight throughout the major portion of its length as indicated at 26, Fig. 1, but terminates at its forward outer end along the edge B of the zone or part A into curved portions 27 and 28 which are connected by a substantially straight or reversed curve part 29. The part 29 terminates at, or merges with, the forward nose or plow-like end 15, as clearly shown in Fig. 1. The inclining operating side or shell-like wall 19 of the member 12 is relatively steep to insure properly the soil being lifted without turning it over.

The operating side 19 causes soil 30, Fig. 4, to be raised a sufficient distance to permit fertilizer to be inserted or applied beneath the under surface of the raised soil as shown in Fig. 4. After the fertilizer has been placed in position, the operating side 19 of the member 12 will permit the lifted soil 30 to gravitate or otherwise return to original, or nearly original, position as shown at 31, Fig. 5.

The member 12 may have a relatively sharp knife or cutting tool 32 applied at its forward end to facilitate in cutting through soil. This cutting member 32 is particularly advantageous in cases where the top surface of the soil is sod.

A bearing shoe 33 may, if desired, be positioned at the bottom of the member 12 along the inner side thereof and may be relatively narrow as clearly shown in Figs. 4 and 5. If desired a second bearing heavy shoe or sole (not shown) but of relatively narrow width may be applied along the outer edge 25 or a part of said outer edge as desired or required. Also the bottom edges of the member 12 along either or both the inner and outer edges may be cut away or recessed, as indicated at 34 in dotted lines in Fig. 3, to arrange for tilting the member 12, particularly if the member is to be hand controlled.

The body of the member 12 is hollow substantially throughout its entire length in the form of a shell and provides a chamber 35 to receive fertilizer 36ª, Fig. 5, as well as to reduce weight. The inner contour of the member 12 surrounding the chamber 35 follows substantially the outer contour of the member, and while the rear end of the member 12 is shown open it may be closed more or less to suit conditions.

The fertilizer which is to be inserted underneath the lifted soil may comprise stalks, manure or any other matter used to fertilize soil, and the fertilizer may be conveyed into the chamber 35 in any manner desired such as by a spreader, rake, conveyor, or sweeper.

A sweeper 36 as shown in Figs. 1 and 2 may be used to advantage, and this sweeper 36 may comprise an angularly positioned rotatively mounted sweeper element 37 driven in any convenient manner, such as by a motor 38 through suitable driving means such as belts and pulleys 39 and 40. The element 37 may be positioned relatively close to the ground so as to effect a sweeping action on the adjacent untilled soil to sweep debris such as stalks, manure or other matter from the top of the ground and place it into the chamber 35 as shown more clearly in Figs. 2 and 4.

The sweeper 36 may be arranged in a housing 41, Fig. 2, to direct the fertilizer onto a distributing shelf 42 where it is directed in proper position to be inserted beneath the uplifted soil 30.

The invention refers to a soil lifting and supporting member which is so constructed and arranged to shear and lift the soil and hold it up a predetermined distance for a predetermined amount of time and then to permit the soil to return to substantially original position, provision being made to insert fertilizer beneath the lifted soil before it returns to original position.

The term "soil" or "top soil," as used herein, is to be considered in its broadest meaning and is to include any type or kind of soil, whether or not it has a top sod or top vegetation. Moreover, the means for supplying the fertilizer into the compartment or recess 35 may be any device capable of directing the material within the recess, whether the directing apparatus be in the form of a rotary broom, as shown, or in the form of a rake, brush, conveyor, manure spreader, or any other device capable of carrying out the function intended.

The invention provides a structure which is adapted to shear and raise the soil a predetermined distance without turning it over, hold it in its elevated position, apply fertilizer beneath the soil while elevated, and then permit the soil to gravitate to substantially its original position, but on top of the pre-laid fertilizer.

After a field has been cultivated or tilled by the structure embodying the present invention, the uppermost surface may be recultivated by the use of cultivating apparatus, such as a disk. The cultivating apparatus may be arranged immediately behind the member 12 so as to cut up the uppermost surface of the soil for seeding purposes. A plurality of elements 12 may be arranged in parallel, side-by-side relationship in the form of a gang, instead of being staggered rearwardly as is conventional in gang plows. The method herein employed positions the fertilizer properly and maintains the moisture in the soil properly so that plant food in solution will be at the root zone of the crops.

Changes may be made in the form, construction and arrangement of parts and the method may be varied within certain limits without departing from the spirit of the invention or sacrificing any of its advantages, and the right is hereby reserved to make all such changes as fairly fall within the scope of the following claims.

The invention is hereby claimed as follows:

1. A farming implement comprising a frame, a pair of supporting wheels mounted on one side of the frame, an elongated hollow shell-shaped member secured to the opposite side of the frame and having an outer surface of predetermined contour and an inner surface of predetermined contour, said outer surface including a first contour zone at the forward end of said member for shearing a strip of soil at a predetermined depth and imparting an initial angular uplift to the strip, said outer surface also including a second contour zone rearwardly of the first said zone for effecting increased angular uplifting of the strip without turning the strip over, said outer surface further including a third contour zone rearwardly of the second said zone for maintaining the strip in a substantial angular position without turning the strip over, a sweeper rotatably mounted on said frame for sweeping material from the ground adjacent the said strip, means for rotating the sweeper, the inner surface of said member being shaped to provide a chamber beneath the said third contour zone on the outer surface of said member, and deflector means for directing the material swept by the sweeper into the chamber, the outer surface of said member finally including a fourth contour zone for permitting the strip to gravitate to substantially original position.

2. A farming implement comprising a frame, a plow mounted on the frame, said plow having a straight front to rear ground engaging surface, an upwardly and outwardly curved soil shearing and lifting part extending rearwardly from the nose of the plow, there being an opening intermediate the ends of the plow on the inner side thereof above the straight ground engaging surface, a deflector adjacent the opening, and a propelled sweeper for sweeping material from a point remote of the plow and depositing it into said opening and against the inside surface of the curved part, whereby said material is fed into said opening within the confines of the plow and beneath the soil lifted by the plow.

3. A farming implement comprising a frame, a plow mounted on the frame, said plow having a straight front to rear ground engaging surface adjacent the frame, an upwardly and outwardly curved soil shearing and lifting part extending rearwardly from the nose of the plow and having a ground engaging edge remote from the frame, there being an opening intermediate the ends of the plow on the inner side thereof above the straight ground engaging surface, a deflector adjacent the opening, and a propelled sweeper for sweeping material from a point remote of the plow and depositing it into said opening and against the inside surface of the curved part, whereby said material is fed into said opening within the confines of the plow and beneath the soil lifted by the plow.

4. A farming implement comprising a frame, a plow mounted on the frame, said plow having a straight front to rear ground engaging surface, an upwardly and outwardly curved soil shearing and lifting part extending rearwardly from the nose of the plow, there being an opening intermediate the ends of the plow on the inner side thereof above the straight ground engaging surface, a deflector adjacent the opening, a rotatable sweeper for sweeping material from a point remote from the plow and depositing it into said opening and against the inside surface of the curved part, whereby said material is fed into said opening within the confines of the plow and beneath the soil lifted by the plow, and power means mounted on said frame for rotating the sweeper.

5. A farming implement comprising a frame, supporting wheels mounted on one side of the frame, a plow mounted on the other side of the frame, said plow having a straight front to rear ground engaging surface, an upwardly and outwardly curved soil shearing and lifting part extending rearwardly from the nose of the plow, there being an opening intermediate the ends of the plow on the inner side thereof above the straight ground engaging surface, a deflector adjacent the opening, and a propelled sweeper for sweeping material from a point remote of the plow and depositing it into said opening and against the inside surface of the curved part, whereby said material is fed into said opening within the confines of the plow and beneath the soil lifted by the plow.

CHARLOTTE RUBY SMITH SEARS.
RICHARD W. SEARS, II.

REFERENCES CITED

The following references are of record in the file of this patent:

UNITED STATES PATENTS

| Number | Name | Date |
|---|---|---|
| Re. 3,616 | Murfee | Aug. 24, 1869 |
| 117,662 | Miner | Aug. 1, 1871 |
| 597,396 | Deterding | Jan. 18, 1898 |
| 673,135 | Denny | Apr. 30, 1901 |
| 836,007 | Bippart | Nov. 13, 1906 |
| 1,239,599 | Hicks | Sept. 11, 1917 |
| 1,803,838 | Carpenter | May 5, 1931 |
| 1,987,268 | Roby | Jan. 8, 1935 |
| 2,232,298 | Wooley et al. | Feb. 18, 1941 |
| 2,265,405 | Strantz | Dec. 9, 1941 |

FOREIGN PATENTS

| Number | Country | Date |
|---|---|---|
| 87,113 | Germany | June 10, 1896 |
| 356,859 | Germany | Aug. 4, 1922 |
| 533,381 | Germany | Sept. 12, 1931 |
| 650,688 | Germany | Sept. 29, 1937 |